US012597813B2

(12) United States Patent

Bradfield

(10) Patent No.: US 12,597,813 B2
(45) Date of Patent: Apr. 7, 2026

(54) ELECTRIC MOTOR WITH COOLANT FLOW AT STATOR SLOTS

(71) Applicant: BorgWarner Inc., Auburn Hills, MI (US)

(72) Inventor: Michael D. Bradfield, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 502 days.

(21) Appl. No.: 18/121,087

(22) Filed: Mar. 14, 2023

(65) Prior Publication Data

US 2024/0313591 A1 Sep. 19, 2024

(51) Int. Cl.
H02K 1/20 (2006.01)
H02K 9/19 (2006.01)

(52) U.S. Cl.
CPC ................. H02K 1/20 (2013.01); H02K 9/19 (2013.01)

(58) Field of Classification Search
CPC .. H02K 1/20; H02K 9/19; H02K 3/24; H02K 5/203; H02K 9/197
See application file for complete search history.

(56) References Cited

U.S. PATENT DOCUMENTS

| 7,633,194 | B2 * | 12/2009 | Dawsey ................ B60L 3/0061 |
| | | | 310/64 |
| 8,492,952 | B2 | 7/2013 | Bradfield |
| 10,038,348 | B2 | 7/2018 | Manz et al. |
| 12,126,242 | B2 * | 10/2024 | Kaiser .................... H02K 15/02 |
| 2012/0080964 | A1 * | 4/2012 | Bradfield ................. H02K 1/20 |
| | | | 310/58 |
| 2021/0351641 | A1 * | 11/2021 | Dlala ........................ H02K 9/19 |

FOREIGN PATENT DOCUMENTS

JP H07264810 A * 10/1995

* cited by examiner

*Primary Examiner* — Mohamad A Musleh
(74) *Attorney, Agent, or Firm* — Howard & Howard Attorneys PLLC

(57) ABSTRACT

An electric motor can be employed for use in a hybrid electric vehicle (HEV) or in a battery electric vehicle (BEV), as example applications. In an implementation, the electric motor has a stator assembly with a multitude of laminations exhibiting an axially-stacked arrangement. The laminations establish coolant channels at a radially-outboard location thereof, and establish slots at a radially-inboard location thereof. Conductors such as windings are disposed at the slots. Some or more of the coolant channels and some or more of the slots are in fluid communication with each other whereby coolant flows through the coolant channels, to the slots, and into contact with the conductors. Enhanced cooling effectiveness at the stator and elsewhere results.

20 Claims, 11 Drawing Sheets

ELECTRIC MOTOR WITH COOLANT FLOW AT STATOR SLOTS

TECHNICAL FIELD

The present application relates generally to electric motors such as those equipped in hybrid electric vehicles (HEVs) and in battery electric vehicles (BEVs) and, more particularly, to cooling measures employed in electric motors.

BACKGROUND

Electric motors are conventional in automotive hybrid and battery electric vehicles as part of the components used to drive rotation of the accompanying vehicle wheels. The electric motors typically have a rotor and a stator. The rotor is caused to rotate, while the stator remains static relative to the rotor. Significant heat is often generated at the electric motors, which can diminish their overall performance. Cooling systems circulate coolant among components of the electric motors in order to dissipate the heat.

SUMMARY

In one implementation, an electric motor may include a housing, a rotor assembly, and a stator assembly. The rotor assembly is partially or more located in the housing. The stator assembly is partially or more located in the housing. The stator assembly includes a multitude of laminations. Some or more of the laminations have a multitude of fins at a radially-outboard location of the laminations. The fins establish coolant channels among the laminations at the radially-outboard location. The laminations establish slots at a radially-inboard location of the laminations. Some or more of the coolant channels and some or more of the slots fluidly communicate with each other. Coolant flow occurs through the coolant channels, to the slots, and into contact with conductors that reside at the slots.

In another implementation, an electric motor includes a stator assembly. The stator assembly may include a multitude of laminations, conductors, and a multitude of liners. The laminations have an axially-stacked arrangement. The laminations establish coolant channels among themselves at a radially-outboard location of the laminations. The laminations establish slots at a radially-inboard location of the laminations. Working slots of the slots have increased radially-outward extents. The increased radially-outward extents can fluidly communicate with working coolant channels of the coolant channels. The conductors reside at the slots. The liners are situated in the slots. The liners are situated partially or more around the conductors. The liners have one or more coolant holes. The coolant hole(s) resides in the liners. The coolant hole(s) can fluidly communicate with the increased radially-outward extents of the working slots.

In yet another implementation, an electric motor may include a housing, a rotor assembly, and a stator assembly. The rotor assembly is partially or more located in the housing. The stator assembly is partially or more located in the housing. The stator assembly may include a multitude of laminations, conductors, a multitude of liners, and a multitude of inserts. The laminations have an axially-stacked arrangement. The laminations have a multitude of fins. The fins establish coolant channels among the laminations at a radially-outboard location of the laminations. The laminations establish slots at a radially-inboard location of the laminations. Working slots of the slots can fluidly communicate with working coolant channels of the coolant channels. The conductors reside at the slots. The liners are situated in the slots and are situated partially or more around the conductors. The liners have one or more coolant holes. The coolant hole(s) resides in the liners. The coolant hole(s) can fluidly communicate with the working slots. The inserts are situated in the working slots.

DETAILED DESCRIPTION

Embodiments of an electric motor 10 with enhanced stator cooling measures are presented in the figures and detailed in this description. Unlike past arrangements, coolant flows at an external coolant jacket of the electric motor's stator assembly, and coolant flows at internal stator slot locations. The coolant comes into and makes direct contact with conductors that reside in the stator slots. The conductors typically generate great amounts of heat amid operation of the electric motor 10, and the coolant helps dissipate the heat. The coolant can wet the conductors in the stator slots. Increased cooling effectiveness at the stator and elsewhere— and particularly at the stator slots and at the conductors— results. Hot spots previously observed at the conductors are minimized or altogether eliminated. Moreover, the enhanced stator cooling measures of the electric motor 10 remove thermal resistance challenges previously encountered such as at walls between coolant and stator laminations and at air gaps between conductors and stator laminations. Furthermore, per at least some embodiments herein, high voltage electrical isolation is maintained at the stator slot locations via liners and inserts assembled therein.

Further, as used herein and unless otherwise specified, the terms axially, radially, and circumferentially, and their related grammatical forms, are used in reference to the generally circular and cylindrical shape of the shown electric motor and its stator assembly. In this sense, axially refers to a direction that is generally along or parallel to a central axis of the circular and cylindrical shape, radially refers to a direction that is generally along or parallel to a radius of the circular and cylindrical shape, and circumferentially refers to a direction that is generally along or in a similar direction as a circumference of the circular and cylindrical shape. Also, the phrase fluidly communicate(s) and its related grammatical forms are used herein to refer to the facility of fluid flow (e.g., coolant flow) between and among relevant components and locations.

Figure 1:
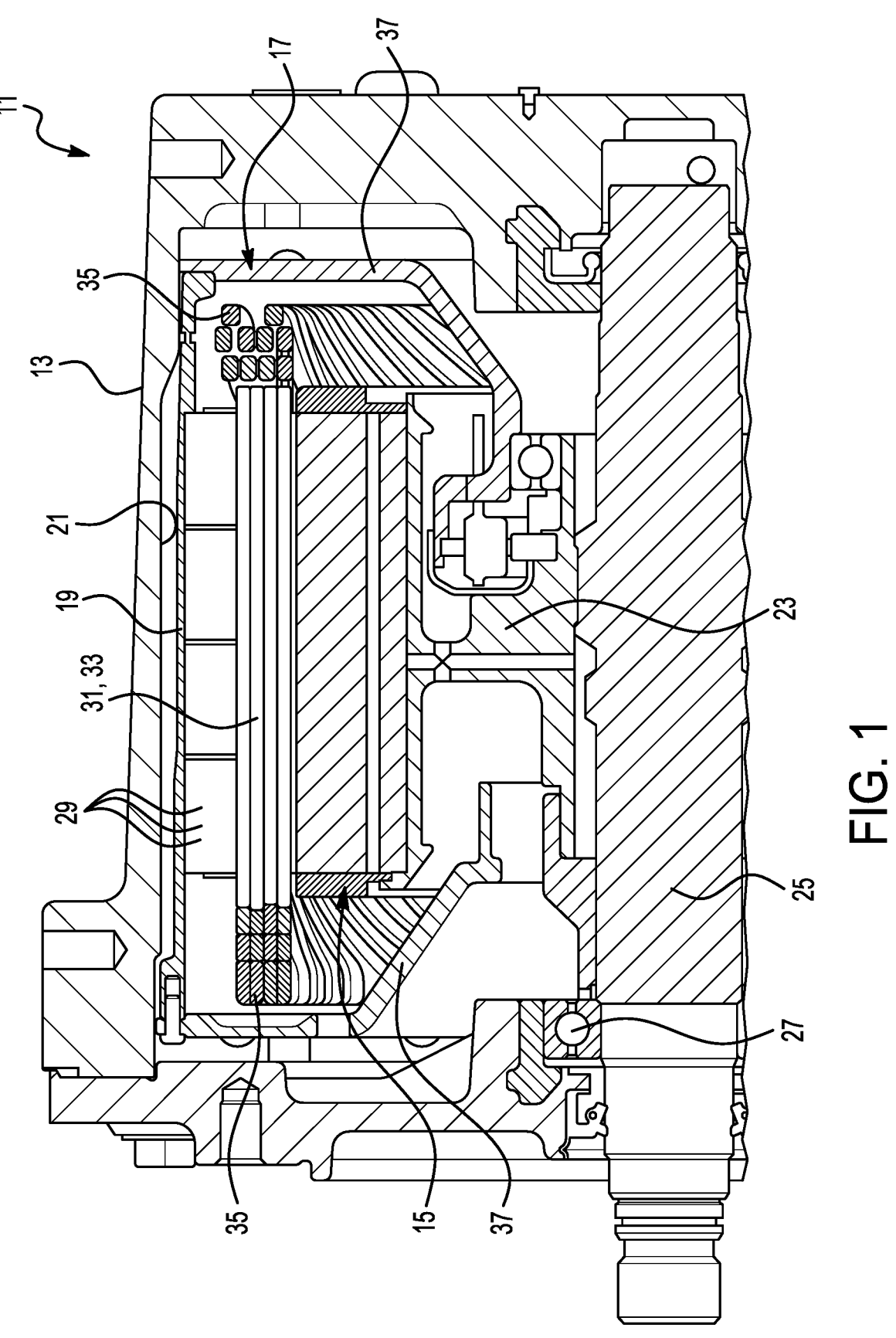
FIG. 1 is a cut-away sectional view of a known electric motor.

In general, the electric motor 10 can be equipped in automotive assemblies such as in hybrid electric vehicles (HEVs) and battery electric vehicles (BEVs), among other possible applications. The electric motor 10 can serve as a component in a larger drive module, for instance, that drives rotation of wheels for a hybrid or battery electric vehicle, or as a component in a regenerative braking system, as but a couple of examples. The electric motor 10 can exhibit various designs and constructions, and can have various components, according to different embodiments and depending upon its application. FIG. 1 shows a known electric motor 11 presented for explanatory and demonstrative purposes. The electric motor 11 has a housing 13, a rotor assembly 15, and a stator assembly 17, as its primary components. A cannister 19 defines a coolant jacket 21 with the housing 13. Coolant flows in the spacing between the confronting surfaces of the cannister 19 and housing 13. The coolant can be oil, water, ethylene glycol, a water/ethylene glycol mixture, or some other substance. The rotor assembly 15 is mostly located and supported within the housing 13. The rotor assembly 15 has a rotor hub 23 and an output shaft 25. The output shaft 25 protrudes out of the housing 13 and is caused to rotate during use. Bearings 27 serve to support rotation of the output shaft 25. The stator assembly 17 is located and supported within the housing 13. The stator assembly 17 has laminations 29 stacked axially together, and has conductors 31 in the form of windings 33. The laminations 29 abut against the cannister 19 and are subject to cooling effects thereby via the coolant jacket 21. The laminations 29 have an unvarying outer diameter. The windings 33 have end turns 35. End frames 37 help support the cannister 19. Still, in other examples, the electric motor could have more, less, and/or different components than those presented here.

Excessive heat is often generated by the electric motor 11 amid its use, which can ultimately degrade performance. In order to dissipate the heat, the coolant jacket 21 is provided in the example of FIG. 1, and the end turns 35 can be sprayed with coolant from an axially-outside location relative to the laminations 29 in other examples. While sufficient in certain regards, it has been observed that increased cooling is often beneficial for overall effectiveness and performance of electric motors.

With reference now to the embodiment of FIGS. 2-8 and 11-12, the electric motor 10 is outfitted with cooling measures for augmented dissipation of heat, especially at a stator assembly 12 but also elsewhere such as at a rotor assembly 14. In general, the stator assembly 12 has a multitude of laminations 16 and has conductors 18 in the form of windings 20 with end turns 22. The laminations 16 can be composed of a magnetically permeable material, as will be known by skilled artisans, and the windings 20 can be typically composed of a copper material. Individual laminations 16 can possess an axial thickness ranging between approximately 0.27-0.35 millimeters (mm), or of approximately 0.35 mm, per examples; still, other thickness values are possible in other examples. The laminations 16 are stacked together in an axial arrangement face-to-face and one after another. In an installation, there can be a total of approximately three hundred individual laminations stacked together according to this example; still, other quantities are possible in other examples including more or less than three hundred. At a radially-inboard side and location RI (FIG. 6), the laminations 16 have teeth 24 projecting radially-inwardly from a main yoke 26 of the laminations 16. The teeth 24 establish slots 28 with open ends 30. The windings 20 are disposed in the slots 28 and held therein in assembly. Further, in general, the rotor assembly 14 has a rotor hub 32 and an output shaft (not depicted). A housing 34 locates and supports the stator assembly 12 and the rotor assembly 14. The housing 34 can have various constructions according to various embodiments.

Figure 2:
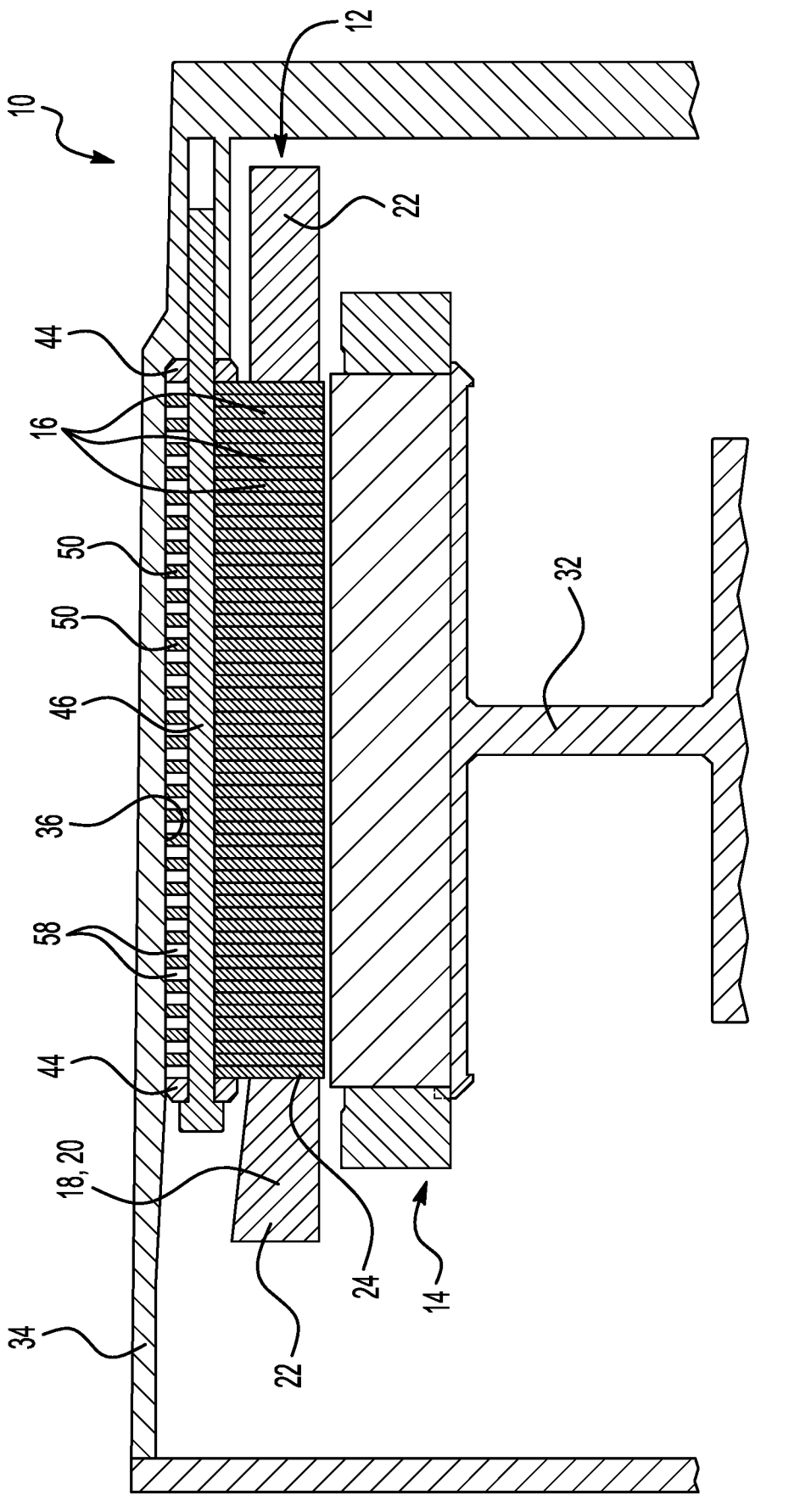
FIG. 2 is a cut-away sectional view of an embodiment of an electric motor.
Figure 4:
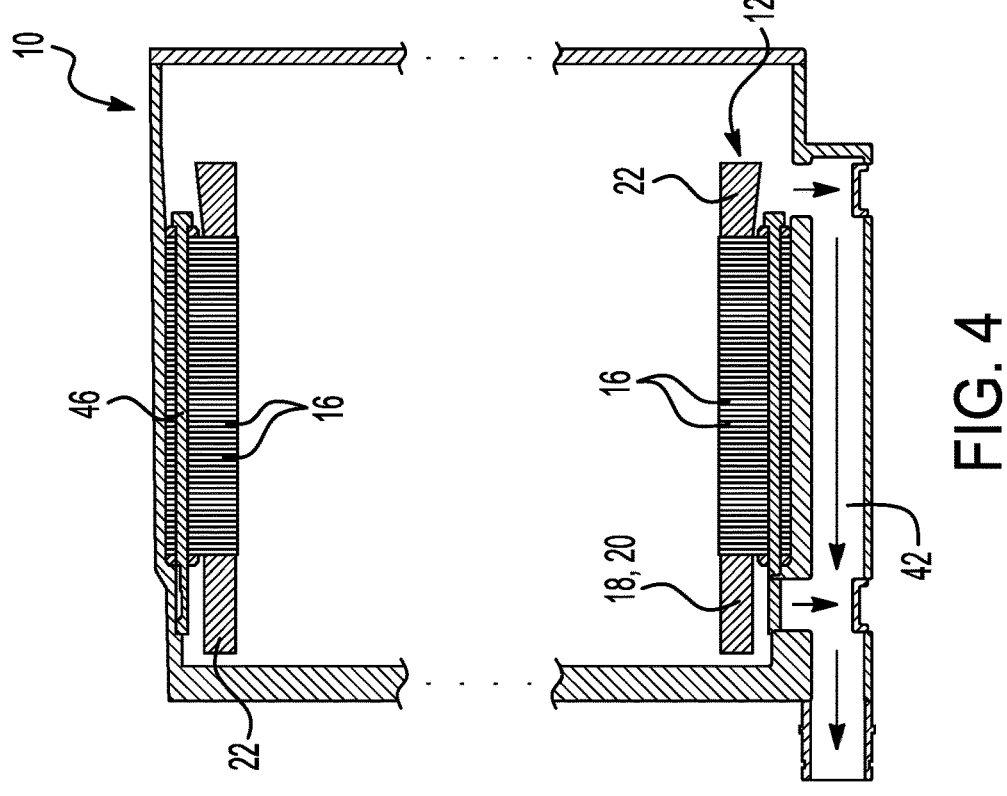
FIG. 4 is a sectional view of the housing, depicting a coolant outlet thereof.
Figures 6, 7:
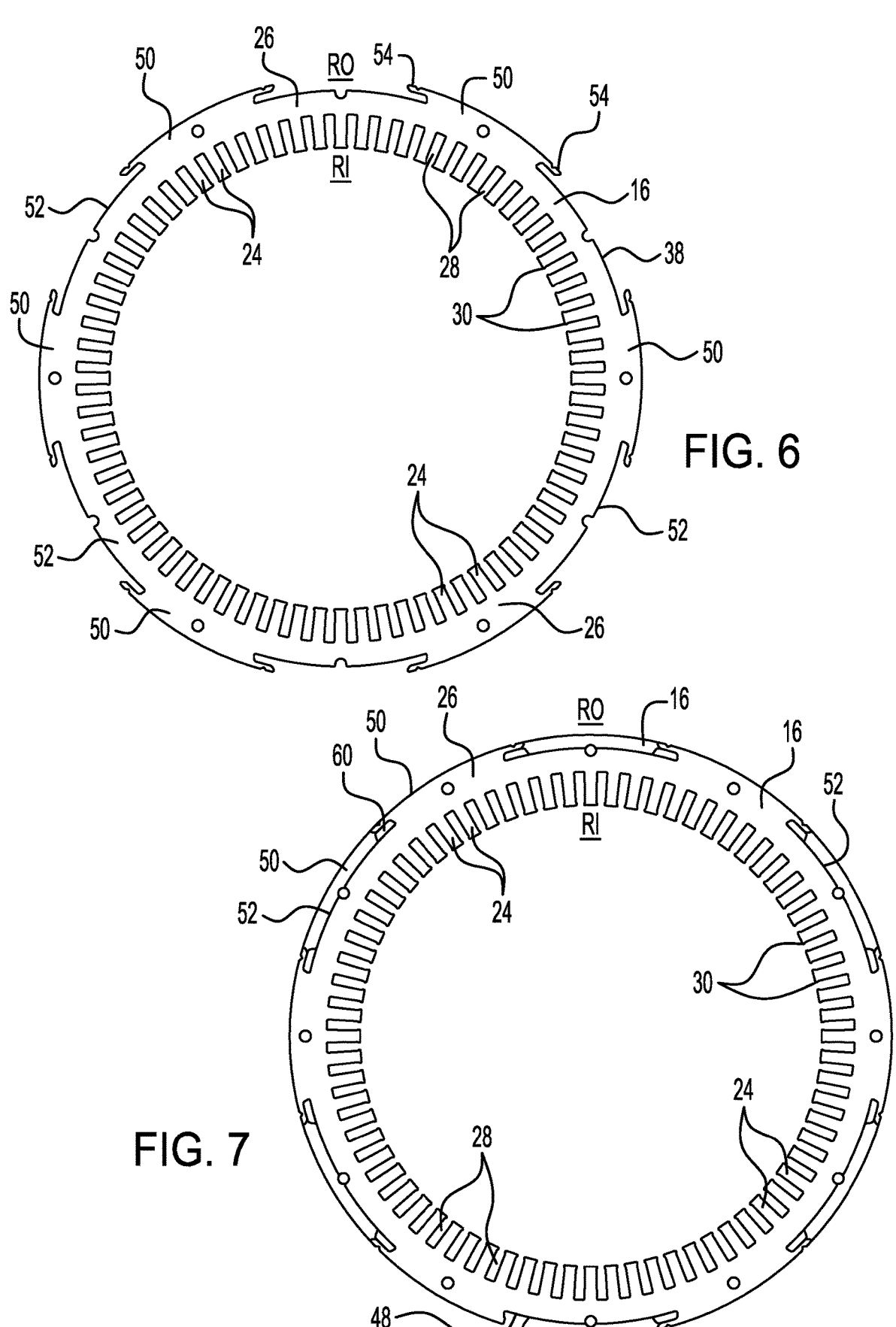
FIG. 6 is a front view of an individual lamination.
FIG. 7 is a front view of a pair of laminations in a stacked and staggered arrangement.

For greater dissipation of heat, the cannister 19 of FIG. 1 is removed from the construction of the electric motor 10 of FIGS. 2-8 and 11-12. Rather, the laminations 16 are received immediately against, and abut directly against, the housing 34 in the absence of the cannister 19. The reception can be a slip-fit, a press-fit, or some other installation technique. Coolant flows in direct contact with the laminations 16 at a radially-outboard side and location RO (FIG. 6). In effect, the coolant jacket's function and role are integrated with the laminations 16, and the laminations 16 are incorporated directly within the cooling circuit. The thermal resistance challenges encountered with use of the cannister 19, as found in some instances, are eliminated. Voids established via a confrontation between an inner surface 36 of the housing 34 and outer surfaces 38 of the laminations 16 accommodate coolant flow therebetween. A coolant inlet 40 (FIG. 3) introduces pumped coolant to the laminations 16 at the radially-outboard location RO, while a coolant outlet 42 (FIG. 4) provides an exit and drain for coolant leaving the housing 34. The coolant inlet 40 and outlet 42 are positioned next to each other about a circumference of the housing 34. At least some coolant flow may travel a full revolution around the housing 34 and around the laminations 16 from the coolant inlet 40 and to the coolant outlet 42. The coolant can also be sprayed directly onto the end turns 22 via spray notches in inner surfaces of end rings 44 (FIG. 2). The end rings 44 are fixed against the laminations 16 via bolts 46, which keeps the laminations 16 in place at the housing 34. An inlet slot 48 formed in the laminations 16 initially receives introduction of coolant from the coolant inlet 40.

With reference now to FIGS. 5-8, in order to increase the surface area of the laminations 16 that comes into direct contact with coolant—and hence enhance the cooling effect—the laminations 16 are provided with a multitude of fins 50 at the radially-outboard location RO of the laminations 16, according to this embodiment. An increase of surface area by a factor of 2.5 to 3 has been demonstrated compared to laminations lacking fins, depending on the design of the fins 50 per varying embodiments. Overall cooling has been shown to improve by approximately 50%. Each individual lamination 16 can have similarly designed and constructed fins 50, and indeed each lamination 16 in the larger axially-stacked arrangement can have the same overall profile. FIG. 6 is an illustration of the profile of a single lamination 16. The lamination 16 has a total of six fins 50 that project radially-outwardly from the main yoke 26; still, other quantities of fins are possible in other embodiments. The fins 50 have elongated circumferential bodies, and are spaced circumferentially apart from one another. The spacing among the fins 50 can be equivalent. Between circumferentially neighboring fins 50, recesses 52 are established at the radially-outboard location RO of the laminations 16. The fins 50 and recesses 52 constitute the radially-outermost edges of the laminations 16. A first radius of the fins 50 taken from a center of the lamination 16 is greater than a second radius of the recesses 52 taken from the center. Further, the fins 50 can have projections 54 extending circumferentially from sides of its main body and jutting out therefrom.

Figure 8:
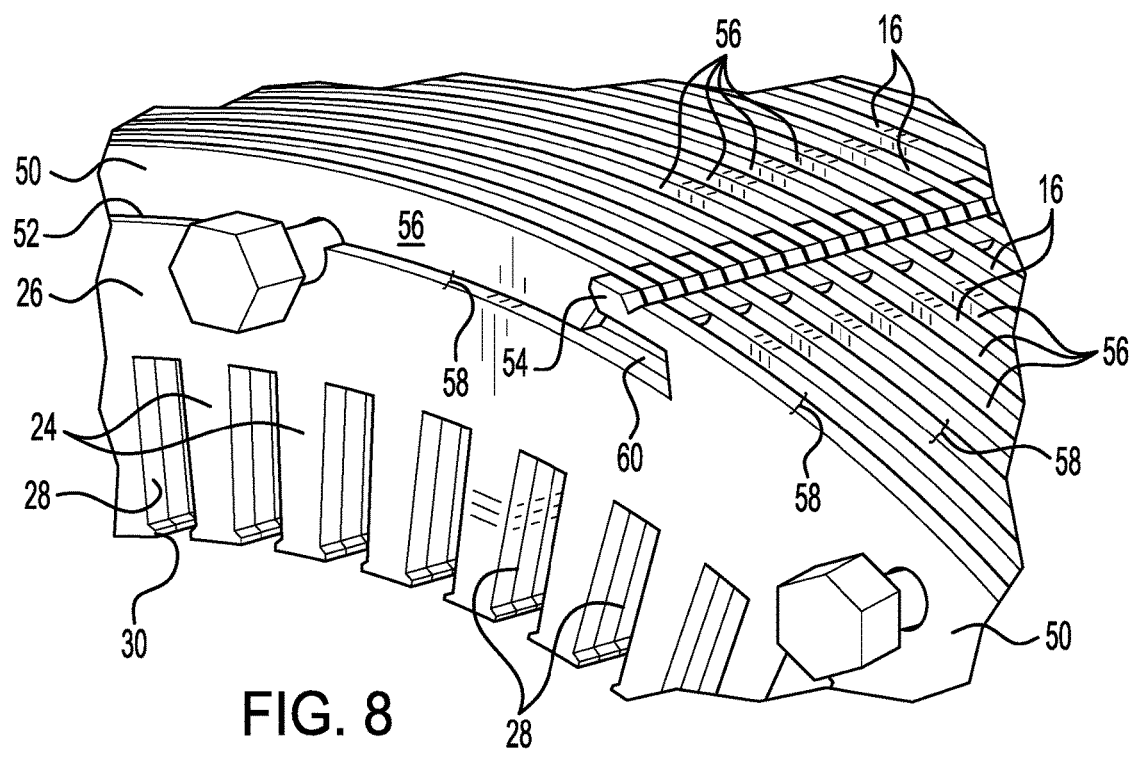
FIG. 8 is an enlarged perspective view of the laminations, showing an embodiment of coolant channels of the laminations.

Referring particularly to FIG. 8, coolant channels 56 are established among stacked and staggered laminations 16 via the fins 50 and recesses 52. Four, six, or another quantity of individual laminations 16 can be axially-stacked with their fins 50 and slots 28 in alignment to produce sets 58 of axially-stacked laminations 16. The sets 58 are made-up of individual laminations 16. In an embodiment, the sets 58 of laminations 16 are angularly and circumferentially rotated and offset thirty degrees (30°) relative to one another—this constructs a circumferentially staggered arrangement, as shown. The coolant channels 56 are defined in part by the circumferentially staggered arrangement, and by confronting surfaces of fins 50 and recesses 52. The circumferentially staggered arrangement can take different forms in different embodiments, including different arrangements and different angularly offset degrees. In the example of the 0.35 mm thick laminations 16, coolant channels 56 having an axial width of 2.1 mm and a radial height of 5 mm are established; still, other dimensions are possible in other examples. Further, overlapping projections 54 establish coolant paths 60 in the circumferentially staggered arrangement and between adjoining coolant channels 56. In this embodiment, the inlet slot 48 is formed by removing this overlap at one circumferential location, as illustrated best in FIG. 7.

Figure 3:
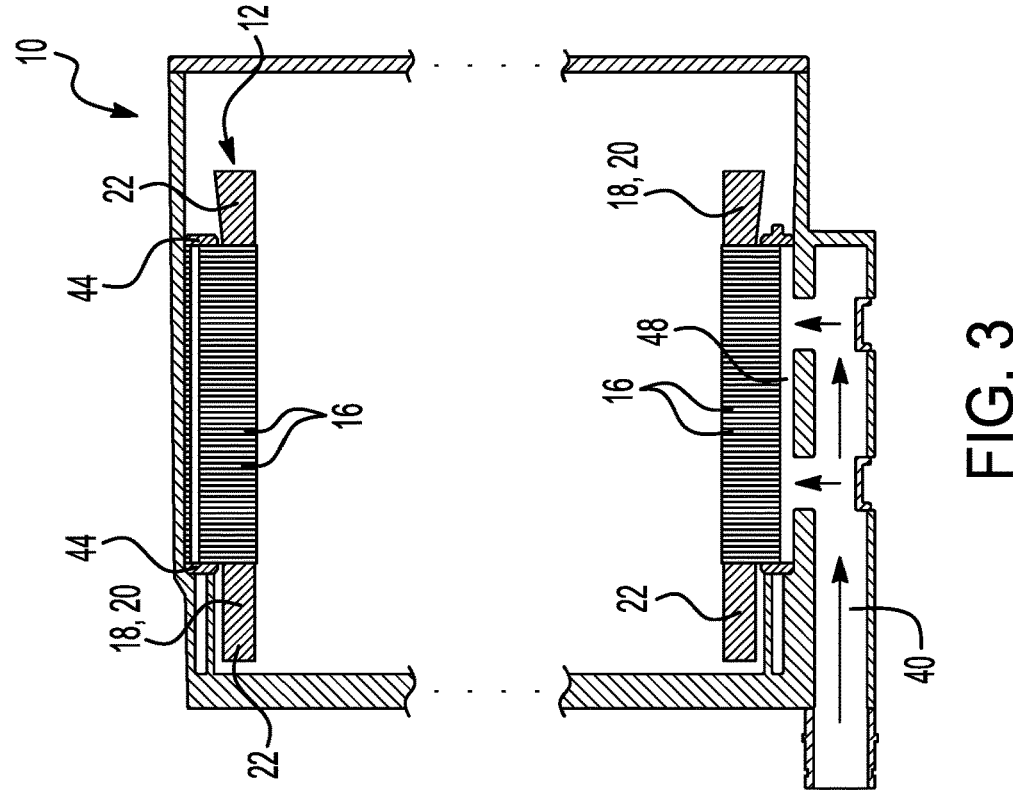
FIG. 3 is a sectional view of an embodiment of a housing of the electric motor, depicting a coolant inlet thereof.
Figure 5:
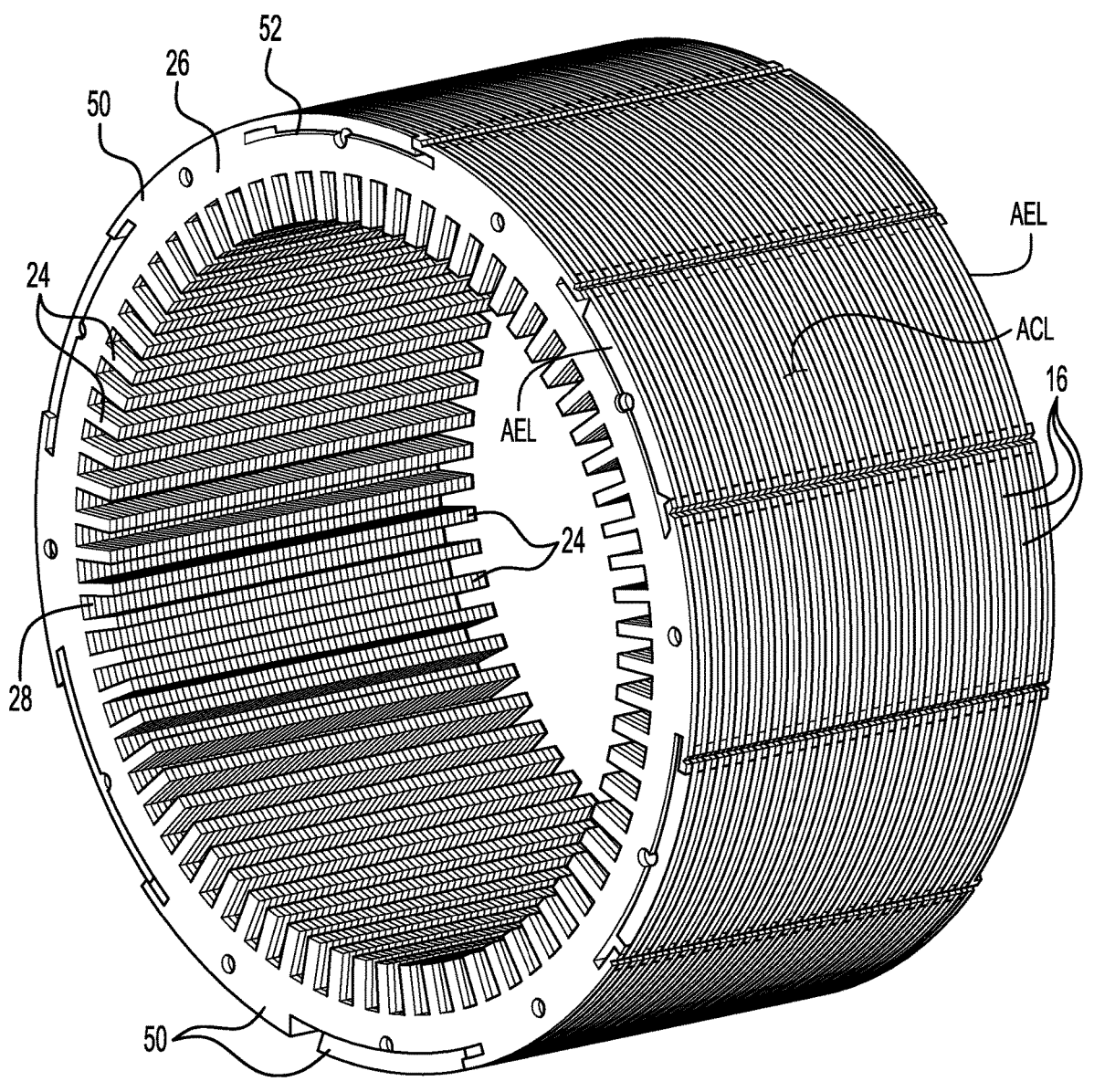
FIG. 5 is a perspective view of an embodiment of laminations of the electric motor.

Coolant flows through the coolant channels 56 at the radially-outboard location RO of the laminations 16. Coolant can flow in a mostly straight circumferential direction, and in parallel paths throughout the coolant channels 56, which has been shown to minimize fluid-flow resistance that may otherwise arise. The flow avoids pronounced zig-zags and sharp bends in its path through the coolant channels 56. A pressure drop is hence minimized. Moreover, a pressure drop is minimized at initial introduction of coolant in the coolant channels 56 by splitting the coolant flow into two main paths on both sides of the laminations, as depicted in FIG. 3. Further, the fins 50 provide an increase in radial height of the main yoke 26. The accompanying increase in structure and material can be employed as part of the main yoke 26 to carry flux in the laminations 16, thereby improving overall flux carrying capabilities of the laminations 16. The increase in structure also imparts greater stiffness of the laminations 16 which can result in enhanced noise, vibration, and harshness (NVH) performance of the stator assembly 12.

Figure 9:
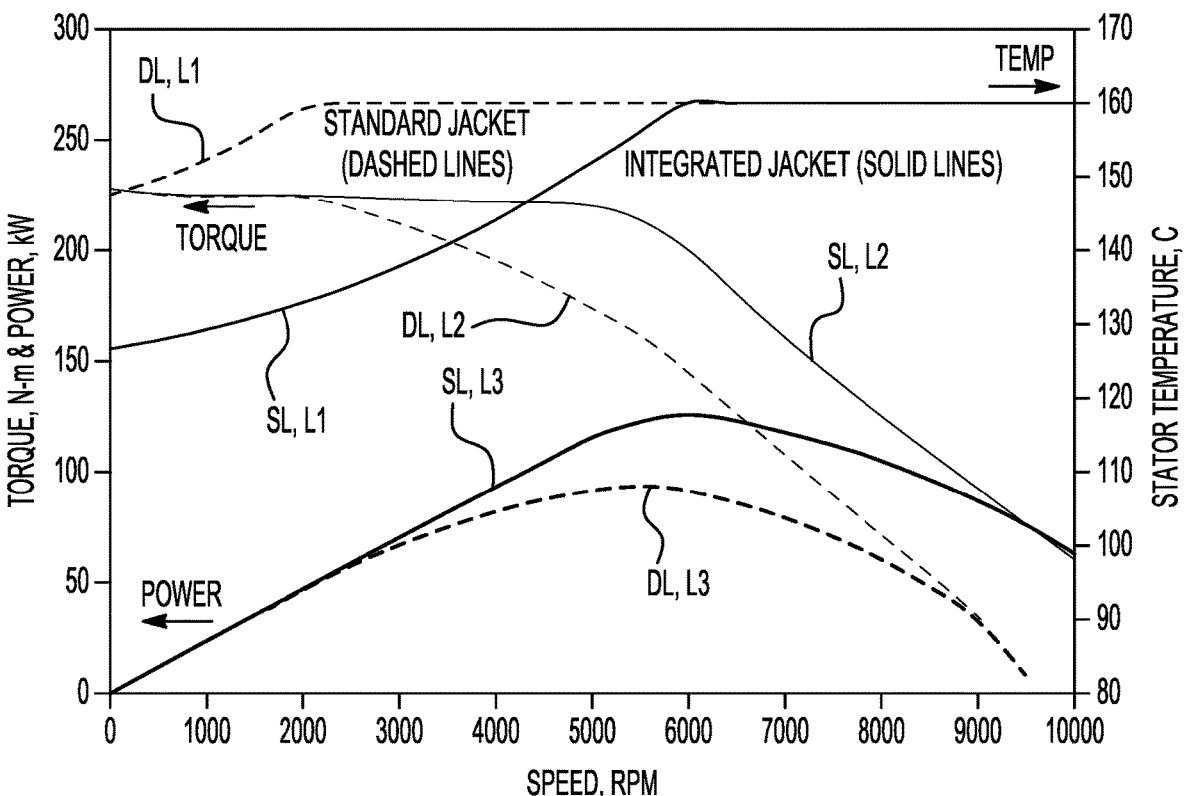
FIG. 9 is a simulated graph presenting speed (revolutions per minute, RPM) on an x-axis, torque and power (newton meters, N·m; kilowatts, kW) on a leftside y-axis, and stator temperature (Celsius, C. °) on a rightside y-axis.

FIG. 9 is a graph of simulated performance results of an electric motor with a cannister and coolant jacket like that depicted in FIG. 1 versus an electric motor without a cannister and with fins and coolant channels like that depicted in FIGS. 2-8. Apart from the cannister and laminations, the electric motors subject to simulation had equivalent designs, constructions, and components. The temperature of the respective stator assemblies was held to 160° C. amid continuous operations. An x-axis presents speed in revolutions per minute (RPM), a leftside y-axis presents torque in newton meters (N·m) and power in kilowatts (kW), and a rightside y-axis presents stator temperature in degrees Celsius (° C.). Dashed lines DL represent the electric motor of FIG. 1, while solid lines SL represent the electric motor of FIGS. 2-8. Lines $L_1$ are temperature, lines $L_2$ are torque, and lines $L_3$ are power. As shown, an improvement in cooling of approximately 45% is furnished by the electric motor of FIGS. 2-8, as is evident from lines $L_1$ between 0 RPM and 2,000 RPM. Furthermore, improvements in torque and power are furnished by the electric motor of FIGS. 2-8, as is evident from lines $L_2$ and $L_3$ beyond 2,000 and 3,000 RPM, respectively. A similar simulation in which the temperature of the respective stator assemblies was held to 180° C. yielded an improvement in cooling of approximately 53%. Still, skilled artisans should appreciate that other simulations may yield other results.

Figure 10:
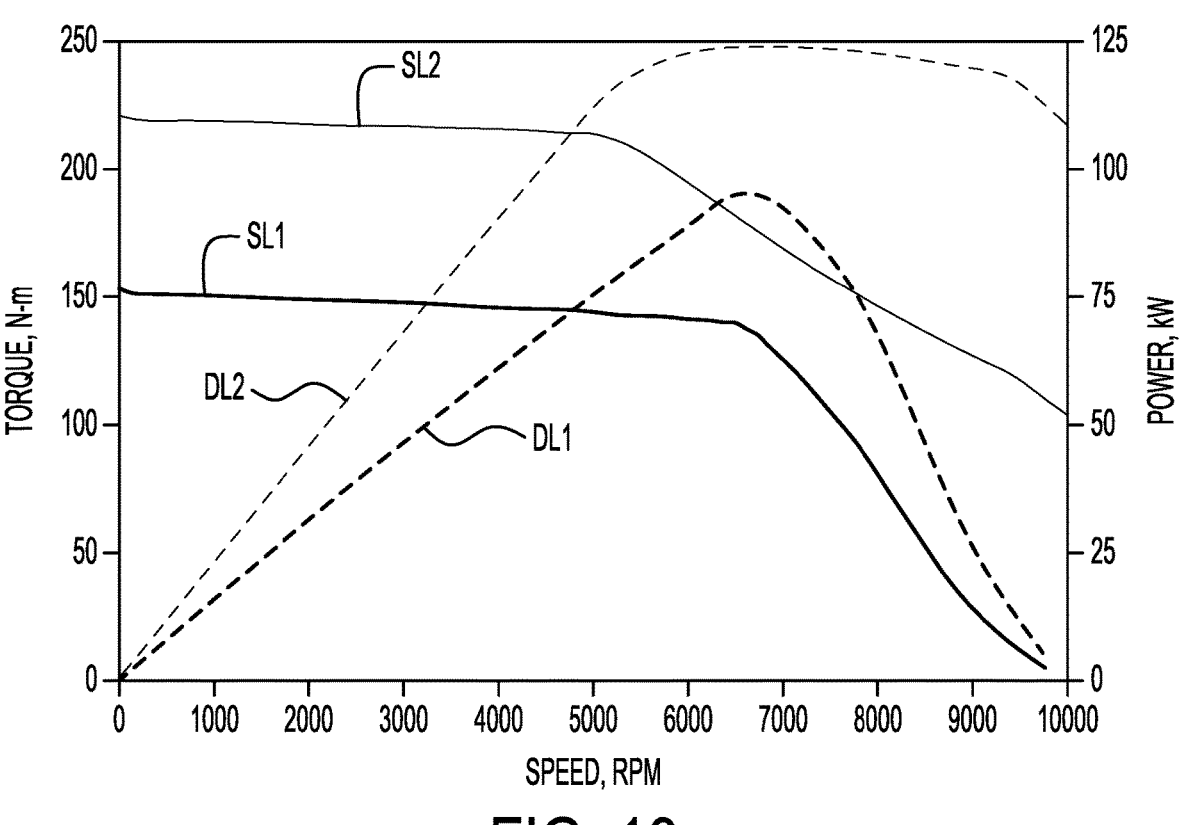
FIG. 10 is a simulated graph presenting speed (revolutions per minute, RPM) on an x-axis, torque (newton meters, N·m) on a leftside y-axis, and power (kilowatts, kW) on a rightside y-axis.

Further, FIG. 10 is a graph of simulated performance results of an electric motor with a cannister and coolant jacket like that depicted in FIG. 1 versus an electric motor without a cannister and with fins and coolant channels like that depicted in FIGS. 2-8. Apart from the cannister and laminations, the electric motors subject to simulation had equivalent designs, constructions, and components. An x-axis presents speed in revolutions per minute (RPM), a leftside y-axis presents torque in newton meters (N·m), and a rightside axis presents power in kilowatts (KW). Solid line $SL^1$ represents the electric motor of FIG. 1 in a first size, and solid line $SL_2$ represents the electric motor of FIGS. 2-8 in the first size. In similar fashion, dashed line $DL_1$ represents the electric motor of FIG. 1 in a second size that is larger than the first size, and dashed line $DL_2$ represents the electric motor of FIGS. 2-8 in the second size. As shown, improvements in torque and power of approximately 46% is furnished by the electric motor of FIGS. 2-8, as is evident at about 1,500 RPM and elsewhere for solid lines $SL_1$ and $SL_2$, and as is evident at about 4,200 RPM and elsewhere for dashed lines $DL_1$ and $DL_2$. Still, skilled artisans should appreciate that other simulations may yield other results.

Figure 11:
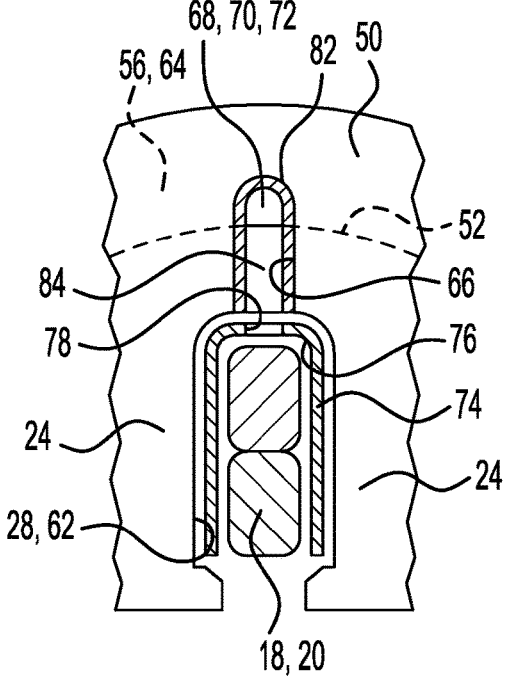
FIG. 11 is an enlarged cutaway showing an embodiment of fluid communication being made between stator slots and coolant channels.
Figure 12:
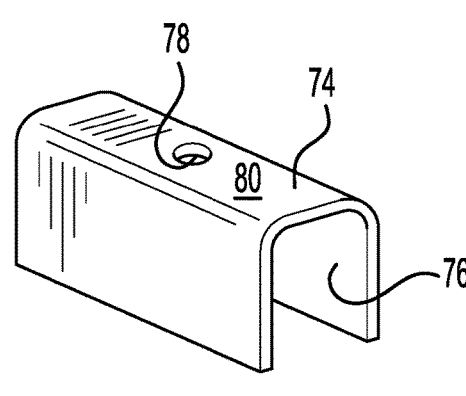
FIG. 12 is a perspective view of an embodiment of a liner with a coolant hole residing therein.

With reference now to FIGS. 11-12, for yet greater dissipation of heat—this time more directly targeted at interior locations of the windings 20—the coolant channels 56 and slots 28 are brought into direct fluid communication with each other at one or more locations in the axially-stacked arrangement of the laminations 16. The fluid communication effects coolant flow from the coolant channels 56 and to and through the slots 28. Accordingly, coolant comes into and makes direct contact with the windings 20 at the slots 28 and at the radially-inboard location RI. Coolant flows at an interior of the slots 28 and at an interior of the windings 20, in addition to coolant spray at an exterior on the end turns 22. The windings 20 are more directly wetted interiorly by coolant. In effect, the cooling circuit is routed through the entire axial extents of the windings 20, where great amounts of heat are often generated. The fluid communication between the coolant channels 56 and slots 28 can be effected in various ways according to different embodiments.

In an embodiment, not all of the sets 58 of laminations 16 are outfitted with this fluid communication in the larger axially-stacked arrangement of the laminations 16, and not all of the laminations 16 themselves are outfitted with the fluid communication. Rather, the fluid communication between the coolant channels 56 and slots 28 can be furnished in one or more sets 58 of laminations 16 at an axially-central location ACL (FIG. 5) of the axially-stacked arrangement. And the fluid communication can be furnished in one or more individual laminations 16 of the one or more sets 58 of laminations 16. In an example, four, five, six, or some other quantity of individual laminations 16 take part in establishing the fluid communication between the coolant channels 56 and the slots 28. In a more specific example, twelve individual laminations 16 take part in establishing the fluid communication between the coolant channels 56 and the slots 28. In this way, coolant flow is introduced into the interior of the windings 20 at the axially-central location ACL, and flows axially-outward from the axially-central location ACL to axially-end locations AEL (FIG. 5) of the axially-stacked arrangement of the laminations 16. Coolant flow travels in one axial direction from the axially-central location ACL and to one axially-end location AEL, and travels in the other, opposite axial direction from the axially-central location ACL and to the other axially-end location AEL. Accordingly, coolant is able to flow all along the entire axial extents of the windings 20. At the axially-end locations AEL, coolant can exit the interior of the windings 20, and flow through the end turns 22 and/or makes its way to the coolant outlet 42.

In the embodiment of FIGS. 11 and 12, the fluid communication between the coolant channels 56 and slots 28 is furnished by elongating working slots 62 of the slots 28 to radially and axially overlap with the adjoining and adjacent coolant channel 56, also referred to as a working coolant channel 64. The elongated working slots 62 can be all of the slots 28 of the respective laminations 16, can be some of the slots 28 of the respective laminations 16, can be one-half of the total slots 28 of the respective laminations 16, or can be some other quantity of the slots 28. With particular reference to FIG. 11, an increased radially-outward extent 66 of the working slots 62 spans upward to the working coolant channel 64 (upward is used with reference to the orientation presented in FIG. 11). The increased radially-outward extent 66 can be circumferentially narrowed compared to the remaining extent of the working slot 62 as shown, or need not and can have the same circumferential width as the remaining extent. A coolant passage 68 between the working slot 62 and working coolant channel 64 is defined and resides at a radially overlapping region 70 and an axially-interfacial region 72 of the working slot 62 and working coolant channel 64. The radially-overlapping region 70 and the axially-interfacial region 72 provide the fluid communication between the coolant channels 56 and slots 28. Coolant flow passes through the coolant passage 68 from the working coolant channel 64 and to the working slot 62 amid use. In another embodiment that lacks specific depiction, the working coolant channels could be elongated radially-inward and downward in order to make fluid communication with the working slots; here, the working slots need not necessarily have the increased radially-outward extent.

Liners 74 are commonly provided as components in stator assemblies in order to electrically isolate the conductors 18 and laminations 16. The liners 74 can be composed of a plastic material, as an example. An individual liner 74 can be situated and inserted in each slot 28 and situated partly or more around the conductors 18, in this case around the windings 20. The liners 74 can extend axially over axial extents of the windings 20, leaving the end turns 22 exposed.

Referring to both FIGS. 11 and 12, to permit coolant flow to an interior 76 of the liners 74 during use, one or more coolant holes 78 can reside at a radially-upward portion 80 of the liners 74, according to this embodiment. Coolant flow travels through the coolant hole(s) 78, into the interior 76, and in contact with the windings 20. The coolant hole(s) 78 can possess varying shapes and varying sizes that facilitate coolant flow therethrough. The coolant hole(s) 78 span wholly through the liners 74. The coolant hole(s) 78 can be located at an approximate axial mid-position in the liner 74 for fluid communication with the coolant passage 68, per this embodiment; other locations of the coolant hole(s) are possible in other embodiments.

With reference now to FIG. 11, in at least some embodiments, inserts 82 are provided in order to furnish an additional degree of electrical isolation and insulation between the conductors 18 and laminations 16. It is currently thought that electrical isolation in higher voltage electric motors (e.g., 400-800 volts) may be compromised in view of the coolant hole(s) 78. The inserts 82 are intended to resolve this issue. The inserts 82 can have various designs and constructions, depending on the embodiment. In the embodiment of FIG. 11, the inserts 82 can be composed of a plastic material, as an example. Individual inserts 82 can be situated and inserted in the increased radially-outward extents 66 of the working slots 62, and can largely resemble the radially outward extents 66 in terms of their shape and size. In this embodiment, the inserts 82 can have a similar design and construction as the liners 74, as shown in FIG. 12, but without the coolant hole(s) 78. As depicted, according to this embodiment the inserts 82 are located adjacent and radially-outward of the coolant hole(s) 78. The inserts 82 can have an axial extent that suitably overlaps with the coolant hole(s) 78, and/or can have an axial extent similar to that of the accompanying liner 74. A coolant passage 84 resides between the inserts 82 and liners 74 to permit coolant flow therethrough. The coolant passage 84 is partly or more defined by confronting surfaces of the inserts 82 and liners 74, and is defined in large part by an interior of the inserts 82. Further, the inserts 82 can be injection molded or made by another manufacturing technique. A webbing or some other connecting portion may extend between an individual insert 82 and an accompanying liner 74 so that the two components can be inserted in place together for ease of installation; the webbing or connecting portion can be composed of the same plastic material as the insert 82. Still, in certain embodiments the inserts 82 may not be needed since the increased radially-outward extents 66 may furnish suitable electrical isolation between the conductors 18 and laminations 16 in view of the clearance and spacing provided thereby.

Figure 13:
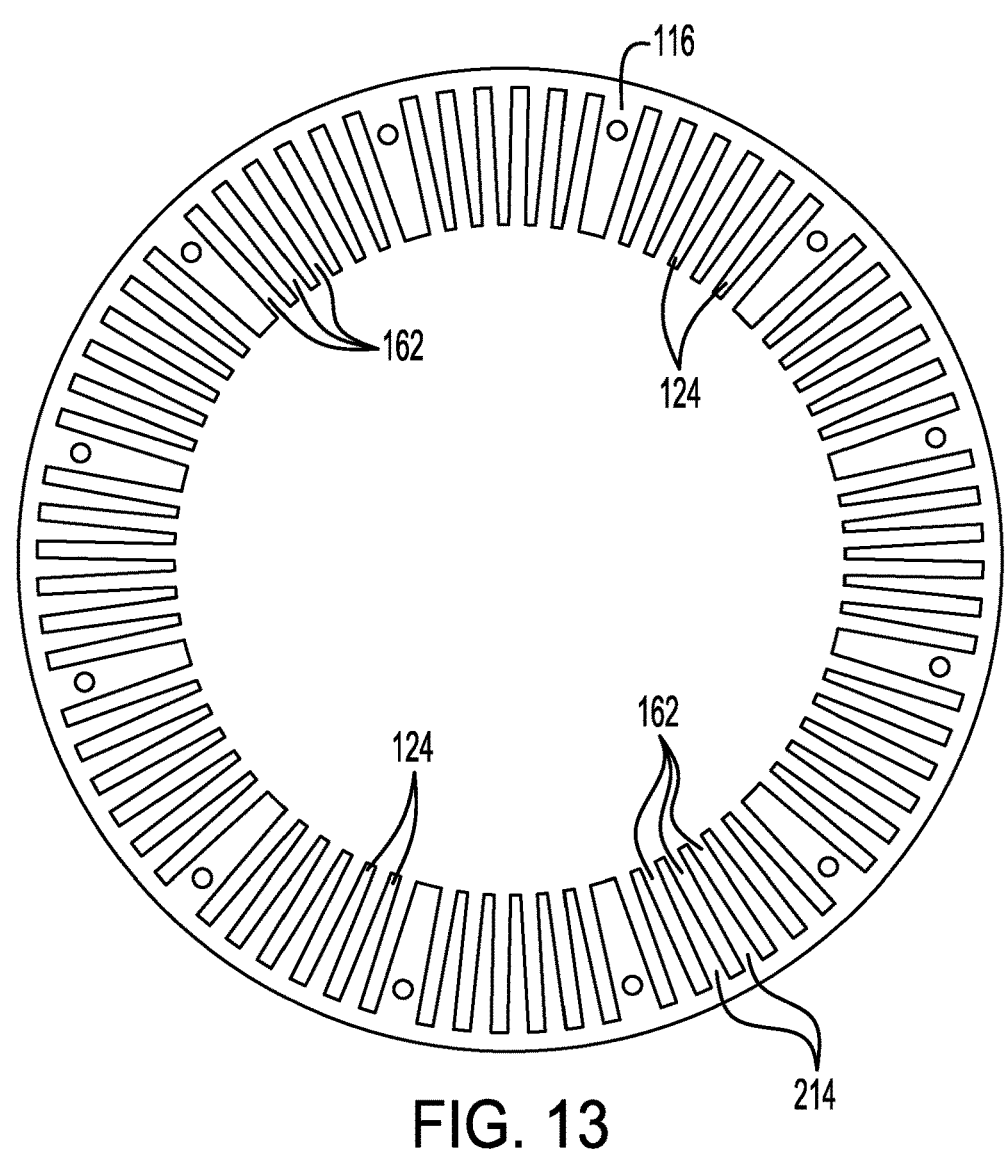
FIG. 13 is a front view of an embodiment of an individual lamination.
Figure 14:
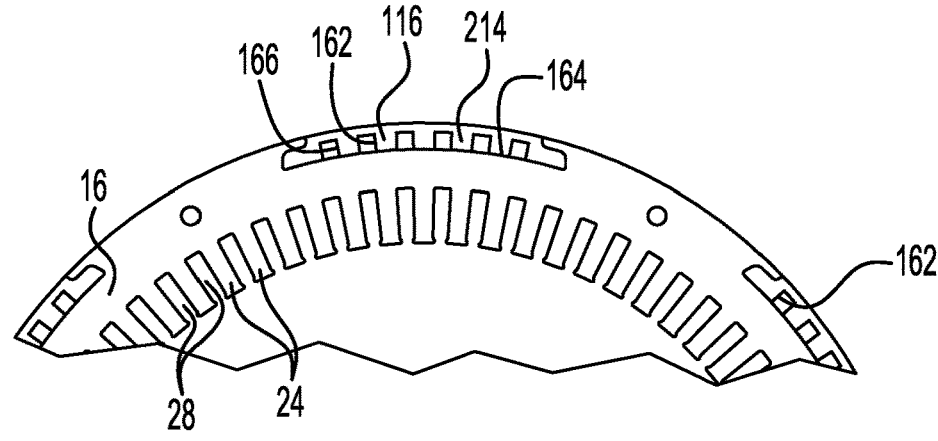
FIG. 14 is a segmented view of the lamination of FIG. 13 in a stacked and staggered arrangement with another lamination.
Figure 17:
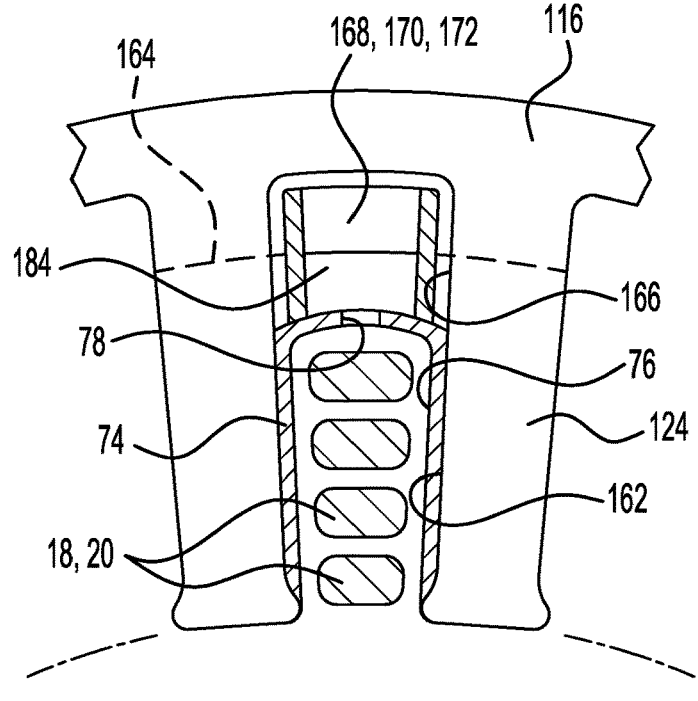
FIG. 17 is an enlarged view of the insert of FIG. 15 assembled in a working slot of the lamination of FIG. 13.

With reference now to FIGS. 13, 14, and 17, another embodiment of laminations 116 is set forth. The laminations 116 have elongated working slots 162 with uniform circumferential widths throughout their radial extents. The laminations 116 can total twelve or some other quantity at the axially-central location ACL to furnish fluid communication between working coolant channels 164 and the working slots 162. In the example of laminations 116 possessing an axial thickness of 0.35 mm and totaling twelve, the stacked laminations 116 at the axially-central location ACL can have an overall axial width of 4.2 mm. As before, an increased radially-outward extent 166 of the working slots 162 spans upward to the working coolant channel 164. The increased radially-outward extents 166 can have uniform circumferential widths throughout their radial extents, as shown, or could be circumferentially narrowed, as previously described. A coolant passage 168 (FIG. 17) between the working slot 162 and working coolant channel 164 is defined and resides at a radially-overlapping region 170 and an axially-interfacial region 172 of the working slot 162 and working cooling channel 164.

Figure 15:
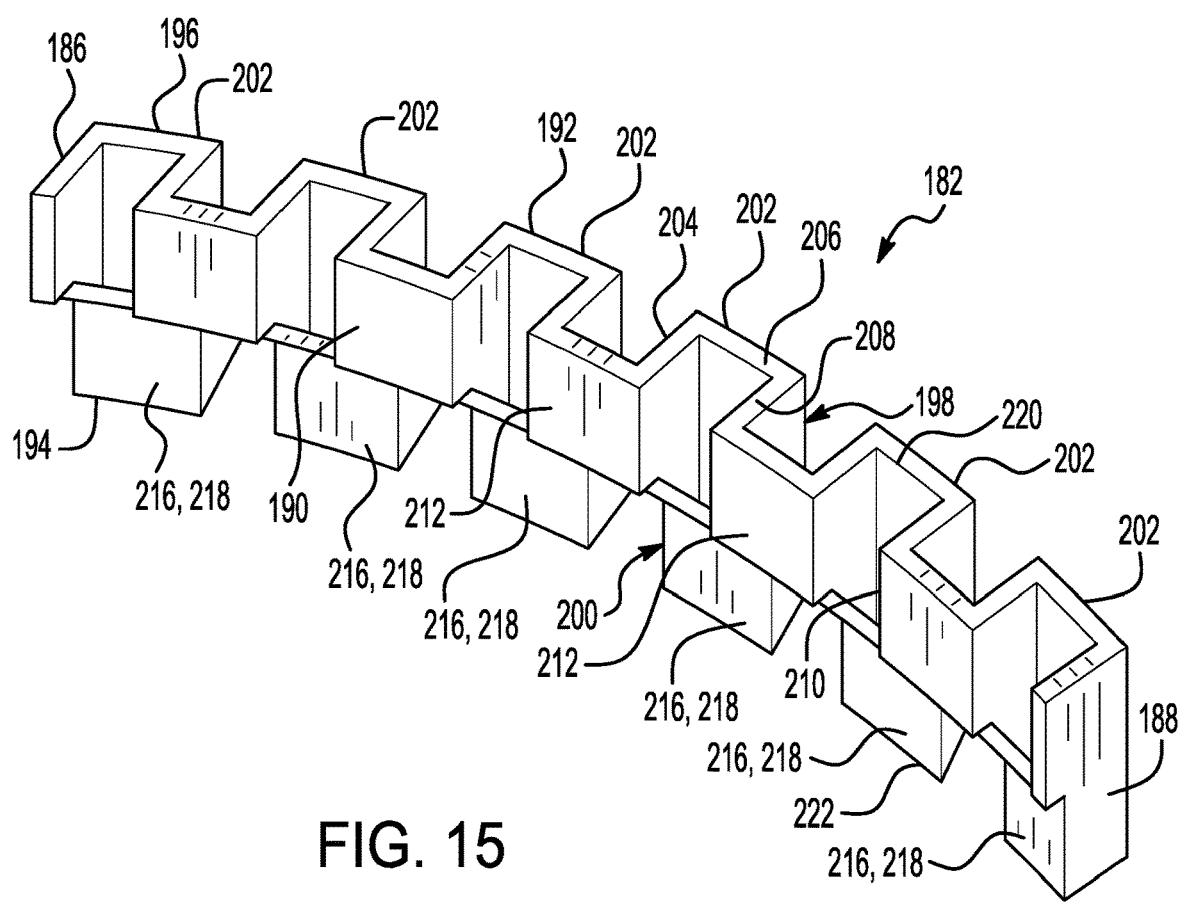
FIG. 15 is a perspective view of an embodiment of an insert.
Figure 16:
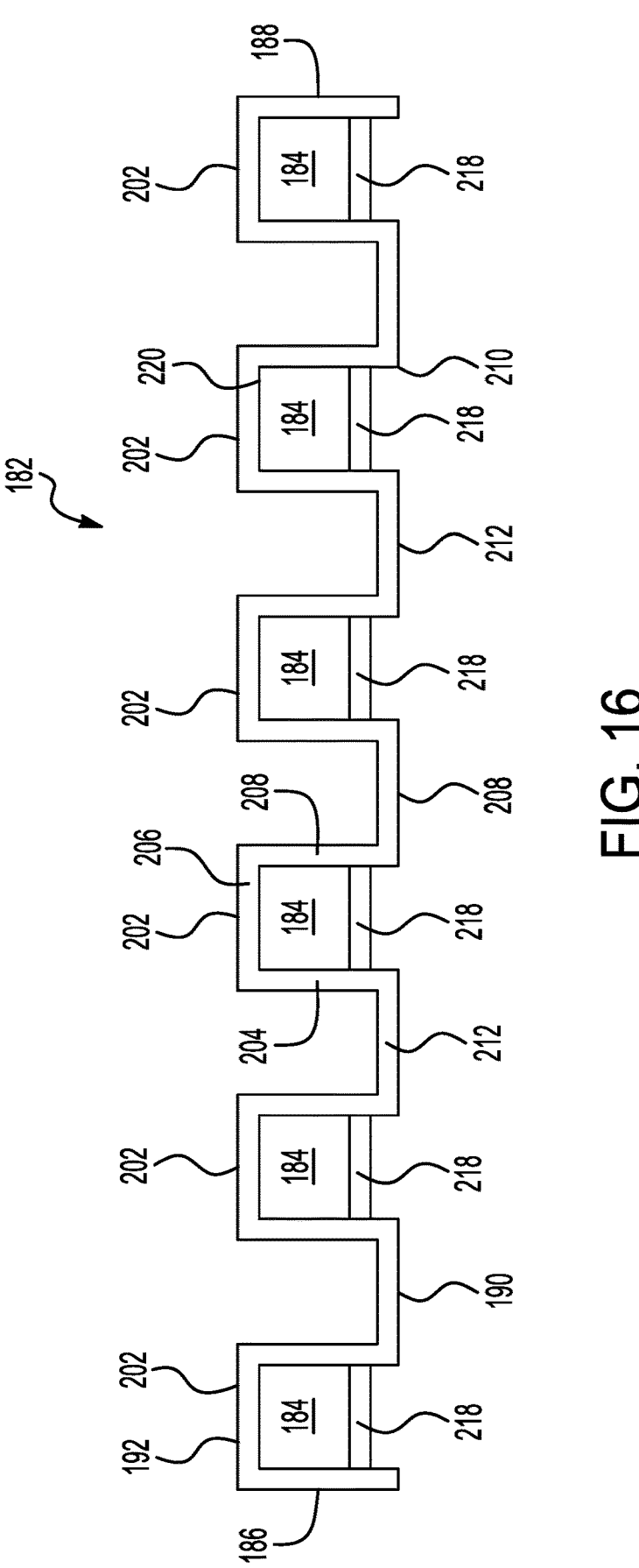
FIG. 16 is a top view of the insert of FIG. 15.

Referring now to FIGS. 15 and 16, another embodiment of an insert 182 is provided in order to furnish an additional degree of electrical isolation and insulation between the conductors 18 and laminations 116. The insert 182 can have various designs and constructions, depending on the embodiment. In this embodiment, the insert 182 has a segmented arc shape, and is designed and constructed for insertion with six working slots 162 and in six increased radially-outward extents 166, since six working slots 162 accompany each working coolant channel 164 according to this embodiment, and as depicted in FIG. 14; still, in other embodiments the insert 182 could have a larger or smaller arc and circumferential extent for insertion with more or less working slots 162. In FIG. 14, there would be a total of twelve inserts 182 inserted around the full circumferential extent of the laminations 116. The insert 182 extends between a first circumferential end 186 and a second circumferential end 188, between a first axial end 190 and a second axial end 192, and between a first radial end 194 and a second radial end 196. Further, per this embodiment, the insert 182 has an upper radial portion 198 and a lower radial portion 200. Both the upper and lower radial portions 198, 200 are situated at the increased radially-outward extents 166 when the inserts 182 are inserted and installed.

With continued reference to FIGS. 15 and 16, at the upper radial portion 198, six three-walled sections 202 are received in six increased radially-outward extents 166. The three-walled sections 202 are inserted in the radially-outward extents 166. Each thee-walled section 202 has a first wall 204, a second wall 206, and a third wall 208. An axially-directed open side 210, established by the absence of a wall thereat, accepts entry of coolant flow from the working coolant channel 164 and to an interior of the working slot 162 at the increased radially-outward extent 166. A bridging wall 212 extends between each three-walled section 202. The bridging wall 212 wraps around a radially-upper portion 214 (FIG. 14) of teeth 124 of the laminations 116. Furthermore, at the lower radial portion 200, six four-walled sections 216 are received in the six increased radially-outward extents 166. Each four-walled section 216 shares the common walls 204, 206, 208 with the respective three-walled section 202, and has an additional fourth wall 218. The upper radial portion 198 has an open top 220, and the lower radial portion 200 has an open bottom 222. Referring now to FIGS. 16 and 17, a coolant passage 184 resides between the inserts 182 and liners 74 to permit coolant flow therethrough. The coolant passage 184 is partly or more defined by confronting surfaces of the inserts 182 and liners 74, and is defined in large part by an interior of the inserts 182. Further, the inserts 182 can be injection molded, or made by some other manufacturing technique.

Figure 18:
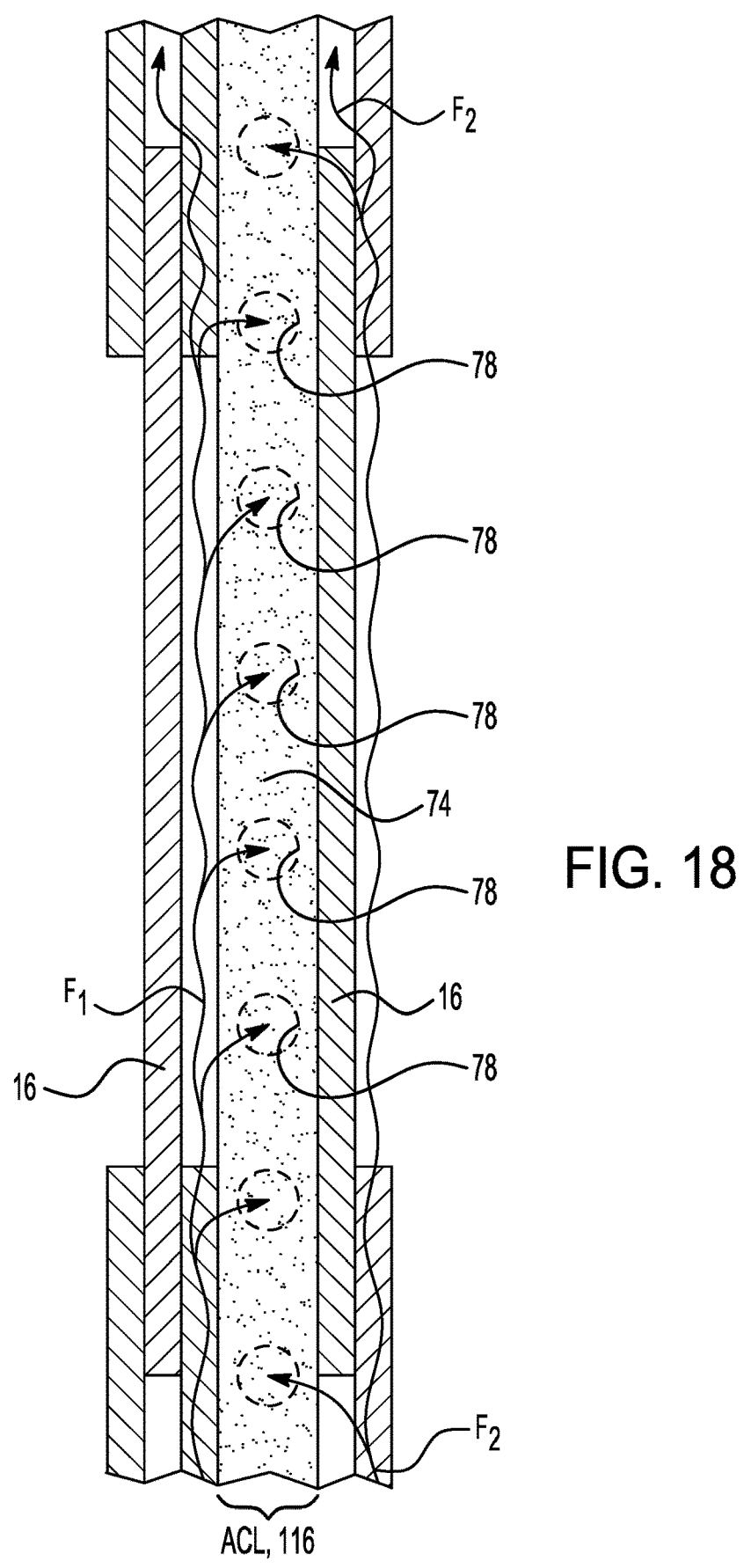
FIG. 18 is an enlarged sectioned view depicting coolant flow at the working slot.

Referring to FIG. 18, during use and due to the axially-stacked arrangement of the laminations 116 adjacent the axially-central location ACL, coolant flow can alternate its travel to the coolant passages 168, 184 from one axial side of the axially-central laminations 116 to the other axial side of the axially-central laminations 116. As demonstrated in the figure and with respect to its orientation, a first coolant flow $F_1$ is fed from a leftside of the laminations 116 at the axially-central location ACL via the coolant passages 168, 184 and to the coolant holes 78 and into the interior 76. Upstream and downstream thereof, a second coolant flow $F_2$ is fed from an opposite rightside of the laminations 116 at the axially-central location ACL via the respective coolant passages 168, 184 thereat and to the coolant holes 78 and into the interior 76. This continues throughout the full circumferential extent of the laminations 116 at the axially-central location ACL.

As used herein, the terms "general" and "generally" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In other instances, the terms "general" and "generally" are intended to represent the inherent degree of uncertainty that is often attributed to any quantitative comparison, value, and measurement calculation, or other representation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electric motor, comprising:
   a housing;
   a rotor assembly at least partially located in the housing; and
   a stator assembly at least partially located in the housing, the stator assembly including a plurality of laminations, at least some of the plurality of laminations having a plurality of fins at a radially-outboard location of the plurality of laminations, the plurality of fins establishing coolant channels among the plurality of laminations at the radially-outboard location, the plurality of laminations establishing slots at a radially-inboard location of the plurality of laminations, wherein at least some of the coolant channels and at least some of the slots fluidly communicate with each other for coolant flow through the coolant channels and to the slots and into contact with conductors residing at the slots.

2. The electric motor as set forth in claim 1, wherein sets of the plurality of fins have a circumferentially staggered arrangement in order to establish the coolant channels among the plurality of laminations at the radially-outboard location.

3. The electric motor as set forth in claim 1, wherein the fluid communication between the at least some coolant channels and the at least some slots is established via radially-overlapping regions of working coolant channels and working slots, coolant passages residing at the radially-overlapping regions and coolant flow passing through the coolant passages and to the slots and into contact with the conductors residing at the slots.

4. The electric motor as set forth in claim 1, wherein the fluid communication between the at least some coolant channels and the at least some slots is established via axially-interfacial regions of working coolant channels and working slots, coolant passages residing at the axially-interfacial regions and coolant flow passing through the coolant passages and to the slots and into contact with the conductors residing at the slots.

5. The electric motor as set forth in claim 1, wherein the fluid communication between the at least some coolant channels and the at least some slots is established via increased radially-outward extents of working slots of a set of laminations of the plurality of laminations.

6. The electric motor as set forth in claim 1, wherein the fluid communication between the at least some coolant channels and the at least some slots is via a set of laminations of the plurality of laminations, the set of laminations having an axially-central location relative to axially-end locations of the plurality of laminations, and coolant flows at the slots from the axially-central locations to the axially-end locations.

7. The electric motor as set forth in claim 1, further comprising a plurality of liners situated in the slots at least partially around the conductors, at least some of the plurality of liners having at least one coolant hole residing therein and adjacent the fluid communication between the at least some coolant channels and the at least some slots, coolant flow passing through the at least one coolant holes and to interiors of the at least some liners and into contact with the conductors residing thereat.

8. The electric motor as set forth in claim 7, further comprising a plurality of inserts situated in working slots of the at least some slots and adjacent the at least one coolant holes of the at least some liners.

9. The electric motor as set forth in claim 1, wherein the fluid communication between the at least some coolant channels and the at least some slots is established via increased radially-outward extents of working slots of a set of laminations of the plurality of laminations, and the electric motor further comprises:

a plurality of liners situated in the slots at least partially around the conductors, the plurality of liners having at least one coolant hole residing therein, coolant flow passing through the at least one coolant holes and into contact with the conductors residing at the slots; and a plurality of inserts situated in the increased radially-outward extents of the working slots.

10. The electric motor as set forth in claim 9, wherein the plurality of inserts is positioned radially-outward of the at least one coolant holes of the plurality of liners.

11. The electric motor as set forth in claim 10, wherein coolant passages reside between the plurality of inserts and the plurality of liners, and coolant flow passes through the coolant passages and through the at least one coolant holes and into contact with the conductors residing at the slots.

12. An electric motor, comprising:

a stator assembly comprising:

a plurality of laminations with an axially-stacked arrangement, the plurality of laminations establishing coolant channels among the plurality of laminations at a radially-outboard location of the plurality of laminations, the plurality of laminations establishing slots at a radially-inboard location of the plurality of laminations, working slots of the slots having increased radially-outward extents, the increased radially-outward extents fluidly communicable with working coolant channels of the coolant channels;

conductors residing at the slots; and a plurality of liners situated in the slots at least partially around the conductors, the plurality of liners having at least one coolant hole residing therein, the at least one coolant holes fluidly communicable with the increased radially-outward extents of the working slots.

13. The electric motor as set forth in claim 12, wherein the stator assembly further comprises a plurality of inserts situated in the increased radially-outward extents of the working slots.

14. The electric motor as set forth in claim 13, wherein the plurality of inserts is positioned radially-outward of the at least one coolant holes of the plurality of liners in order to provide electrical isolation thereat between the plurality of laminations and the conductors.

15. The electric motor as set forth in claim 12, wherein the plurality of laminations has a plurality of fins, the plurality of fins establishing the coolant channels at the radially-outboard location of the plurality of laminations.

16. The electric motor as set forth in claim 12, wherein the working slots reside in a set of laminations of the plurality of laminations, the set of laminations having axially-central locations in the axially-stacked arrangement of the plurality of laminations.

17. An electric motor, comprising:

a housing;

a rotor assembly at least partially located in the housing; and a stator assembly at least partially located in the housing, the stator assembly comprising:

a plurality of laminations with an axially-stacked arrangement, the plurality of laminations having a plurality of fins, the plurality of fins establishing coolant channels among the plurality of laminations at a radially-outboard location of the plurality of laminations, the plurality of laminations establishing slots at a radially-inboard location of the plurality of laminations, working slots of the slots fluidly communicable with working coolant channels of the coolant channels;

conductors residing at the slots;

a plurality of liners situated in the slots at least partially around the conductors, the plurality of liners having at least one coolant hole residing therein, the at least one coolant holes fluidly communicable with the working slots; and a plurality of inserts situated in the working slots.

18. The electric motor as set forth in claim 17, wherein the plurality of inserts is positioned radially-outward of the at least one coolant holes of the plurality of liners.

19. The electric motor as set forth in claim 18, wherein the working slots reside in a set of laminations of the plurality of laminations, the set of laminations having axially-central locations in the axially-stacked arrangement of the plurality of laminations.

20. The electric motor as set forth in claim 19, wherein, amid use of the electric motor, coolant flow passes through the working coolant channels, through the working slots, through the at least one coolant holes, into contact with the conductors, and to axially-end locations in the axially-stacked arrangement of the plurality of laminations.

* * * * *